United States Patent
Shen et al.

(10) Patent No.: US 12,475,971 B2
(45) Date of Patent: Nov. 18, 2025

(54) STORAGE UNIT ACCESS METHOD, STORAGE UNIT REPAIR METHOD, DIE, AND MEMORY CHIP

(71) Applicant: HUAWEI TECHNOLOGIES CO., LTD., Guangdong (CN)

(72) Inventors: Guoming Shen, Dongguan (CN); Rongbin Liu, Shenzhen (CN); Qingqing Wu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 77 days.

(21) Appl. No.: 18/495,883

(22) Filed: Oct. 27, 2023

(65) Prior Publication Data

US 2024/0055070 A1    Feb. 15, 2024

Related U.S. Application Data

(63) Continuation of application No. PCT/CN2021/091480, filed on Apr. 30, 2021.

(51) Int. Cl.
*G11C 29/00* (2006.01)

(52) U.S. Cl.
CPC .............. *G11C 29/76* (2013.01); *G11C 29/72* (2013.01); *G11C 29/787* (2013.01)

(58) Field of Classification Search
CPC ... G11C 29/76; G06F 11/2094; G06F 11/2056
See application file for complete search history.

(56) References Cited

U.S. PATENT DOCUMENTS

| 6,101,138 A | 8/2000 | Shiah et al. |
| 6,275,406 B1 * | 8/2001 | Gibson .................. G11C 15/04 |
| | | 365/49.17 |
| 2012/0072768 A1 * | 3/2012 | Morris ................ G06F 11/1666 |
| | | 714/6.32 |

(Continued)

FOREIGN PATENT DOCUMENTS

| CN | 104008780 A | 8/2014 |
| WO | 2014047225 A1 | 3/2014 |

OTHER PUBLICATIONS

International Search Report and Written Opinion issued in PCT/CN2021/091480, dated Jan. 26, 2022, 12 pages.

(Continued)

*Primary Examiner* — Michael Maskulinski
*Assistant Examiner* — Bryan P Huang

(57) ABSTRACT

A storage unit access method includes receiving an access request that includes an access address, where the access address includes one or more original addresses of at least one storage unit in a storage apparatus; identifying, based on global repair information, whether a failed unit exists in the storage unit to which the access address points, where the global repair information includes original addresses of all failed units and a redundant address of a redundant unit configured to replace each failed unit; when it is identified that a first failed unit exists, replacing an original address that is in the access address and that points to the first failed unit with a redundant address of a first redundant unit corresponding to the first failed unit; and sending an access request obtained after replacing the original address with the redundant address.

18 Claims, 8 Drawing Sheets

(56) References Cited

U.S. PATENT DOCUMENTS

| | | | | |
|---|---|---|---|---|
| 2014/0013185 A1* | 1/2014 | Kobla | ............... | G11C 11/4097 |
| | | | | 714/768 |
| 2014/0082453 A1* | 3/2014 | Sikdar | ............... | G06F 11/108 |
| | | | | 714/763 |
| 2014/0298087 A1* | 10/2014 | Li | ............... | G06F 11/1469 |
| | | | | 714/6.11 |
| 2018/0190367 A1 | 7/2018 | Jeddeloh et al. | | |
| 2019/0108892 A1 | 4/2019 | Berke et al. | | |
| 2019/0333601 A1* | 10/2019 | Wilson | ............... | G11C 17/16 |

OTHER PUBLICATIONS

Extended European Search Report issued in EP21938471.6, dated Mar. 13, 2024, 8 pages.

* cited by examiner

STORAGE UNIT ACCESS METHOD, STORAGE UNIT REPAIR METHOD, DIE, AND MEMORY CHIP

CROSS-REFERENCE TO RELATED APPLICATIONS

This application is a continuation of International Application No. PCT/CN2021/091480, filed on Apr. 30, 2021, the disclosure of which is hereby incorporated by reference in its entirety.

TECHNICAL FIELD

The present disclosure relates to the field of storage technologies, and in particular, to a storage unit access method, a storage unit repair method, a die, and a memory chip.

BACKGROUND

With rapid development of semiconductor technologies, memory chip with storage functions are becoming increasingly large in scale.

To ensure a yield rate of a chip, if a failed row is found in a normal data storage area in a chip test process, a one-time programmable memory (efuse) needs to be burnt to cut off a row selection signal of the failed row, and simultaneously, a row selection signal of a redundant row used for replacement is connected. After a burning operation is performed, when a user request for performing read/write access on an original row address pointing to the failed row is received, a row selection signal selected after a row decoder performs a row decoding operation on the original row address is the row selection signal of the redundant row. Then, to-be-written data is stored in the redundant row, or data stored in the redundant row is read. After a read/write operation is performed on the redundant row, a response message returned to a user carries the original row address. In this process, the user is unaware of an operation of replacing the redundant row.

Currently, to switch a row selection signal by burning the efuse, a logically complex circuit for switching of a row selection signal needs to be deployed on a store die, causing a problem of a large size of a product.

SUMMARY

The present disclosure provides a storage unit access method, a storage unit repair method, a die, and a memory chip, to reduce a size of a product based on failure replacement.

According to a first aspect, a storage unit access method is provided and is applied to a repair apparatus. The method includes:

receiving an access request that includes an access address, where the access address includes an original address of at least one storage unit in a storage apparatus;

identifying, based on global repair information, whether a failed unit exists in the at least one storage unit to which the access address points, where the global repair information includes an original address of at least one failed unit existing in the storage apparatus and a redundant address of a redundant unit configured to replace each failed unit in the at least one failed unit;

when it is identified that a first failed unit exists in the at least one storage unit to which the access address points, replacing an original address that is in the access address and that points to the first failed unit with a redundant address of a first redundant unit corresponding to the first failed unit; and sending an access request obtained after replacing the original address with the redundant address.

In embodiments of the present disclosure, the repair apparatus identifies, when receiving the access request that includes the access address, based on the global repair information, whether a failed unit exists in the storage unit to which the access address points, replaces, when identifying that the first failed unit exists in the storage units to which the access address points, the original address that is in the access address and that points to the first failed unit with the redundant address of the redundant unit corresponding to the first failed unit, and sends an access request obtained after replacing the original address with the redundant address. Therefore, using a redundant unit to repair the failed unit can be implemented. According to a technical solution provided in embodiments of the present disclosure, because a logically complex circuit for switching of a row selection signal does not need to be configured and supported for the storage unit in the storage apparatus, an optional circuit in the storage apparatus can be simplified, and a tiled area occupied by the storage apparatus can be reduced. Therefore, a tiled area occupied by a final product can be greatly reduced, and the product can be miniaturized.

In a possible implementation, the storage apparatus is a store die, and the repair apparatus is a logic die.

In a possible implementation, the storage apparatus is a store die, the repair apparatus is located on a logic die that includes a controller, and the repair apparatus is connected to the store die by using the controller.

In a possible implementation, the storage apparatus is a memory chip, and the repair apparatus is a primary chip.

In a possible implementation, the storage apparatus is a memory chip, the repair apparatus is located on a primary chip that includes a controller, and the repair apparatus is connected to the memory chip by using the controller.

In an example, the store die may include a row decoder. The row decoder is configured to connect to the logic die.

In an example, the store die includes at least one storage unit and at least one redundant unit. The failed unit is a faulty failed storage unit, and the redundant unit is configured to replace the failed unit to execute the access request.

In an example, the store die may include at least one data storage area and at least one redundant area. Each storage unit in the store die is located in each data storage area, and each redundant unit is located in each redundant area. In an example, one data storage area may correspond to one redundant area. Based on this, a redundant unit in the redundant area may be used only to replace a failed unit in the data storage area corresponding to the redundant area to which the redundant unit belongs. In another example, a plurality of data storage areas may correspond to one redundant area. Based on this, a redundant unit in the redundant area may be used to replace failed units in the plurality of data storage areas. In other words, storage units in the plurality of data storage areas may share a redundant unit in one redundant area.

In an actual application, the store die may include a plurality of banks, and each bank may include a plurality of sectors.

In an example, one data storage area and one redundant area may be provided for each bank. In an example, one data storage area may be provided for each bank, and one redundant area may be provided for a plurality of banks.

In an example, one data storage area and one redundant area may be provided for each sector. In an example, one data storage area may be provided for each sector, and one redundant area may be provided for a plurality of banks.

In an example, each storage unit may be a row located in a data storage area, and each redundant unit may be a row located in a redundant area.

In embodiments of the present disclosure, the original address of a storage unit belongs to an original address segment, and the redundant address of a redundant unit belongs to a redundant address area. Any original address points to a storage unit in any data storage area of the store die, and any redundant address points to a redundant unit in any redundant area of the store die.

In a possible implementation, before the receiving an access request that includes an access address, the method further includes:
  receiving an original address, sent by the storage apparatus, of a second failed unit existing in the storage apparatus;
  allocating a second redundant unit configured to replace the second failed unit; and
  adding, to the global repair information, a correspondence between the original address of the second failed unit and a redundant address of the second redundant unit, where
  the second failed unit is the same as or different from the first failed unit.

In a possible implementation, the repair apparatus includes a one-time programmable memory (efuse).

Before the receiving an access request that includes an access address, the method further includes:
  receiving an original address, sent by the storage apparatus, of a third failed unit existing before encapsulation in the storage apparatus;
  allocating a third redundant unit configured to replace the third failed unit existing before encapsulation;
  storing, into the efuse, a correspondence between the original address of the third failed unit existing before encapsulation and a redundant address of the redundant unit corresponding to the third failed unit; and
  each time the repair apparatus is powered on, adding, to the global repair information, a correspondence that is between the original address of the at least one failed unit existing in the storage apparatus and a redundant address of a redundant unit corresponding to each failed unit and that is read from the efuse, where
  the third failed unit is the same as or different from the first failed unit.

In a possible implementation, the method further includes:
  receiving an access response that includes the redundant address of the first redundant unit and that is sent by the storage apparatus;
  replacing the redundant address of the first redundant unit with the original address of the first failed unit based on the global repair information; and
  sending an access response that includes the original address of the first failed unit to a bus.

In a possible implementation, the storage apparatus is the store die, the repair apparatus is located on the logic die that includes a controller, and the repair apparatus is connected to the store die by using the controller.

The store die includes at least two data storage areas, and the global repair information includes original addresses of all failed units in the at least two data storage areas and a redundant address of a redundant unit configured to replace each failed unit in the at least two data storage areas.

In a possible implementation, any storage unit is a data row, and any redundant unit is a redundant row.

In a possible implementation, the first redundant unit and the first failed unit are located in a same sector of the storage apparatus; or the first redundant unit and the first failed unit are located in different sectors of a same bank of the storage apparatus; or the first redundant unit and the first failed unit are located in different banks of the storage apparatus.

According to a second aspect, a storage unit access method is provided and is applied to a storage apparatus. The storage apparatus includes at least one storage unit. The method includes:
  receiving an access request that is sent by a repair apparatus and includes an access address, where the access address includes a redundant address of a redundant unit in the storage apparatus, and the redundant unit is configured to replace a failed unit in the at least one storage unit;
  accessing the redundant address; and
  sending an access response to the repair apparatus.

In a possible implementation, the storage apparatus is a store die, and the repair apparatus is a logic die; or
  the storage apparatus is a store die, the repair apparatus is located on a logic die that includes a controller, and the repair apparatus is connected to the store die by using the controller; or
  the storage apparatus is a memory chip, and the repair apparatus is a primary chip; or
  the storage apparatus is a memory chip, the repair apparatus is located on a primary chip that includes a controller, and the repair apparatus is connected to the memory chip by using the controller.

In a possible implementation, before the receiving an access request that is sent by a repair apparatus and includes an access address, the method further includes:
  sending an original address of the failed unit to the repair apparatus when the failed unit exists in the storage unit in the storage apparatus, so that the repair apparatus allocates the redundant unit configured to replace the failed unit, and adds, to global repair information, a correspondence between the original address of the failed unit and the redundant address of the redundant unit.

According to a third aspect, a storage unit repair method is provided and is applied to a storage apparatus. The method includes:
  sending an original address of the failed unit to a repair apparatus when a failed unit exists in a storage unit in the storage apparatus, so that the repair apparatus allocates a redundant unit configured to replace the failed unit.

In a possible implementation, the sending an original address of the failed unit to a repair apparatus when a failed unit exists in a storage unit in the storage apparatus includes:
  detecting whether a failed unit exists in the storage unit in the storage apparatus before the storage apparatus is encapsulated; and
  sending the original address of the failed unit to the repair apparatus when the failed unit exists in the storage unit in the storage apparatus.

According to a fourth aspect, a storage unit repair method is provided and is applied to a repair apparatus. The method includes:

receiving an original address, sent by a storage apparatus, of a failed unit existing in a storage unit in the storage apparatus;

allocating a redundant unit configured to replace the failed unit; and adding the original address of the failed unit and a redundant address of the redundant unit to global repair information.

In a possible implementation, the repair apparatus includes an efuse. The receiving an original address, sent by a storage apparatus, of a failed unit existing in a storage unit in the storage apparatus includes receiving an original address, sent by the storage apparatus, of at least one failed unit existing before encapsulation in the storage apparatus.

The allocating a redundant unit configured to replace the failed unit includes allocating each redundant unit configured to replace each failed unit existing before encapsulation.

The adding the original address of the failed unit and a redundant address of the redundant unit to global repair information includes: storing, into the efuse, a correspondence between an original address of each failed unit existing before encapsulation and a redundant address of a redundant unit corresponding to each failed unit; and each time the repair apparatus is powered on, adding, to the global repair information, a correspondence that is between the original address of the at least one failed unit existing in the storage apparatus and the redundant address of the redundant unit corresponding to each failed unit and that is read from the efuse.

According to a fifth aspect, a repair apparatus is provided and includes:

a transceiver module, configured to receive an access request that includes an access address, where the access address includes an original address of at least one storage unit in a storage apparatus; and a processing module, configured to identify, based on global repair information, whether a failed unit exists in the storage unit to which the access address points. The global repair information includes an original address of at least one failed unit existing in a store die and a redundant address of a redundant unit configured to replace each failed unit in the at least one failed unit. When it is identified that a first failed unit exists in the storage unit to which the access address points, an original address that is in the access address and that points to the first failed unit is replaced with a redundant address of a first redundant unit corresponding to the first failed unit.

The transceiver module is further configured to send an access request obtained after replacing the original address with the redundant address.

In a possible implementation, the transceiver module is further configured to receive an original address, sent by the storage apparatus, of a second failed unit existing in the storage apparatus, before receiving the access request that includes the access address. The processing module is configured to allocate a second redundant unit configured to replace the second failed unit, and add, to the global repair information, a correspondence between the original address of the second failed unit and a redundant address of the second redundant unit. The second failed unit may be the same as or different from the first failed unit.

In a possible implementation, the repair apparatus includes a one-time programmable memory (efuse). The transceiver module is further configured to receive an original address, sent by the storage apparatus, of a third failed unit existing before encapsulation in the storage apparatus, before receiving the access request that includes the access address. The processing module is further configured to allocate a third redundant unit configured to replace the third failed unit, store, in the efuse, a correspondence between the original address of the third failed unit existing before encapsulation and a redundant address of the third redundant unit, and add, to the global repair information, the correspondence that is between the original address of the third failed unit existing in the storage apparatus and the redundant address of the third redundant unit and that is read from the efuse, each time the repair apparatus is powered on.

In a possible implementation, the transceiver module is further configured to receive an access response that includes the redundant address of the first redundant unit and is sent by the storage apparatus. The processing module is further configured to obtain, based on the global repair information, the original address of the first failed unit corresponding to the first redundant unit, and add the original address of the first failed unit to the access response. The transceiver module is further configured to send an access response that includes the original address of the first failed unit to a bus.

According to a sixth aspect, a storage apparatus is provided and includes:

a transceiver module, configured to receive an access request that is sent by a repair apparatus and includes an access address, where the access address includes a redundant address of a redundant unit in the storage apparatus, and the redundant unit is configured to replace a failed unit in at least one storage unit; and a processing module, configured to access the redundant address. The transceiver module is further configured to send an access response to the repair apparatus.

In a possible implementation, the processing module is further configured to detect whether a failed unit exists in the storage unit in the storage apparatus, before the access request that includes the access address and that is sent by the repair apparatus is received. The transceiver module is further configured to send an original address of the failed unit to the repair apparatus when the failed unit exists in the storage unit in the storage apparatus, so that the repair apparatus allocates the redundant unit configured to replace the failed unit, and adds, to global repair information, a correspondence between the original address of the failed unit and the redundant address of the redundant unit.

According to a seventh aspect, a storage apparatus is provided and includes:

a processing module, configured to detect whether a failed unit exists in the storage apparatus; and a transceiver module, configured to send an original address of the failed unit to a repair apparatus when a failed unit exists in a storage unit in the storage apparatus.

In a possible implementation, the processing module is specifically configured to detect whether a failed unit exists in the storage unit in the storage apparatus, before the storage apparatus is encapsulated. The transceiver module is specifically configured to send the original address of the failed unit to the repair apparatus when the failed unit exists in the storage unit in the storage apparatus.

According to an eighth aspect, a repair apparatus is provided and includes:

a transceiver module, configured to receive an original address, sent by a storage apparatus, of a failed unit existing in at least one storage unit in the storage apparatus; and a processing module, configured to allocate a redundant unit configured to replace the failed unit, and configured to add the original address of the failed unit and a redundant address of the redundant unit to global repair information.

In a possible implementation, the repair apparatus includes a one-time programmable memory (efuse).

The transceiver module is specifically configured to receive the original address, sent by the storage apparatus, of at least one failed unit existing before encapsulation in the storage apparatus. The processing module is specifically configured to allocate a redundant unit configured to replace each failed unit existing before encapsulation; specifically configured to store, in the efuse, a correspondence between an original address of each failed unit existing before encapsulation and a redundant address of the redundant unit corresponding to each failed unit; and each time the repair apparatus is powered on, add, to the global repair information, a correspondence that is between the original address of the at least one failed unit existing in the storage apparatus and the redundant address of the redundant unit corresponding to each failed unit and that is read from the efuse.

According to a ninth aspect, a repair apparatus is provided and includes an interface, a processor, and a memory.

The interface is configured to connect a storage apparatus and a bus. The memory is configured to store instructions. The processor is configured to execute the instructions to implement the method according to any one of the first aspect and the fourth aspect or the possible implementations of the first aspect and the fourth aspect.

In a possible implementation, the storage apparatus is a store die, and the repair apparatus is a logic die; or the storage apparatus is a store die, the repair apparatus is located on a logic die that includes a controller, and the repair apparatus is connected to the store die by using the controller; or the storage apparatus is a memory chip, and the repair apparatus is a primary chip; or the storage apparatus is a memory chip, the repair apparatus is located on a primary chip that includes a controller, and the repair apparatus is connected to the memory chip by using the controller.

In a possible implementation, the memory further includes a one-time programmable memory (efuse).

In an example, the processor may include a DRAM controller.

According to a tenth aspect, a storage apparatus is provided and includes an interface, a processor, and a memory.

The interface is configured to connect a repair apparatus and a bus. The memory is configured to store instructions and data. The processor is configured to execute the instructions to implement the method according to any one of the second aspect and the third aspect or the possible implementations of the second aspect or the third aspect.

In an example, the processor may include a row address decoder.

In a possible implementation, each storage unit includes at least one data row, and each redundant unit includes at least one redundant row.

According to an eleventh aspect, a memory chip is provided and includes:

a logic die and at least one store die. The logic die includes a repair apparatus and a controller. The repair apparatus communicates with the store die by using the controller.

The logic die is configured to perform the method according to any one of the first aspect or the fourth aspect or the possible implementations of the first aspect or the fourth aspect.

The store die is configured to perform the method according to any one of the second aspect or the third aspect or the possible implementations of the second aspect or the third aspect.

According to a twelfth aspect, a memory chip is provided and includes:

a logic die and at least one store die.

The logic die is configured to perform the method according to any one of the possible implementations of the first aspect. The store die is configured to perform the method according to any one of the possible implementations of the second aspect.

Alternatively, the logic die is configured to perform the method according to any one of the possible implementations of the fourth aspect. The store die is configured to perform the method according to any one of the possible implementations of the third aspect.

According to another aspect, an apparatus is provided. The apparatus includes a processing module and a transceiver module. The processing unit executes instructions to control the apparatus to perform the method according to any one of the first aspect or the possible designs of the first aspect.

In a possible implementation, the apparatus may further include a storage module.

In a possible implementation, the apparatus may be a memory chip.

In an example, the processing module may be a processor. The transceiver module may be a transceiver. If the storage module is further included, the storage module may be a memory.

In another example, when the apparatus is a memory chip, the processing module may be a processor, and the transceiver module may be an input/output interface, a pin, a circuit, or the like. If the storage module is further included, the storage module may be a storage module (for example, a register or a cache) in the chip, or may be a storage module (for example, a read-only memory or a random-access memory) outside the chip.

The processor mentioned anywhere above may be a general-purpose central processing unit (CPU for short), a microprocessor, an application-specific integrated circuit (ASIC for short), or one or more integrated circuits configured to control program execution of the spatial multiplexing methods in the foregoing all aspects.

According to still another aspect, a computer-readable storage medium is provided. The computer-readable storage medium stores instructions. The instructions may be executed by one or more processors on a processing circuit. When the instructions are run on a computer, the computer is enabled to perform the method according to any one of the first aspect or the possible implementations of the first aspect.

According to still another aspect, a computer program product that includes instructions is provided. When the computer program product is run on a computer, the computer is enabled to perform the method according to any one of the first aspect or the possible implementations of the first aspect.

BRIEF DESCRIPTION OF DRAWINGS

To illustrate the technical solutions in the present disclosure or in a conventional technology more clearly, the following briefly introduces the accompanying drawings used in describing embodiments or the conventional technology. Apparently, the accompanying drawings in the following description show some embodiments of the present disclosure, and a person of ordinary skill in the art may still derive other drawings from these accompanying drawings without creative efforts.

DESCRIPTION OF EMBODIMENTS

The terms used in the present disclosure are only used to explain example embodiments of the present disclosure, but are not intended to limit the present disclosure.

Embodiment 1

Embodiments of the present disclosure provide a storage unit access method, a storage unit repair method, and related technical solutions.

The methods according to embodiments of the present disclosure may be applied to a chip having a storage function. In embodiments of the present disclosure, the chip having the storage function may be referred to as a memory chip. For example, the memory chip may be a dynamic random-access memory (DRAM), a static random-access memory (SRAM), a non-volatile memory (NVM), or the like.

In embodiments of the present disclosure, the memory chip may be formed by one or more dies. Before the memory chip is delivered from a factory, a manufacturer of the memory chip needs to perform quality detection on dies that form the chip, and after the detection, encapsulate the multiple dies that form the chip, to obtain the memory chip.

Figure 1:
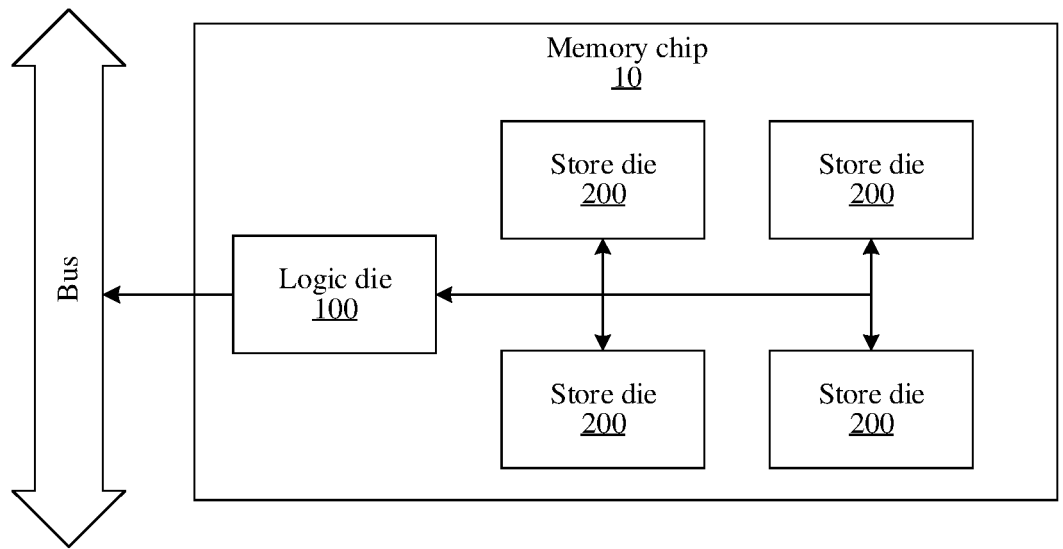
FIG. 1 is a schematic diagram of a structure of an example memory chip according to an embodiment of the present disclosure.

FIG. 1 is a schematic diagram of a structure of an example memory chip according to an embodiment of the present disclosure.

As shown in FIG. 1, a memory chip 10 may include one logic die 100 and at least one store die 200. One or more storage arrays may be deployed on each store die. In an example, storage arrays deployed on each store die may be divided into one or more banks, and each bank may be divided into one or more sectors. Each sector can be divided into multiple rows. An address decoder, such as a row address decoder, may be further deployed on each store die, and may also be referred to as a row decoder. In an example, after encapsulation, the memory chip may further include an outer encapsulation layer.

Figure 2:
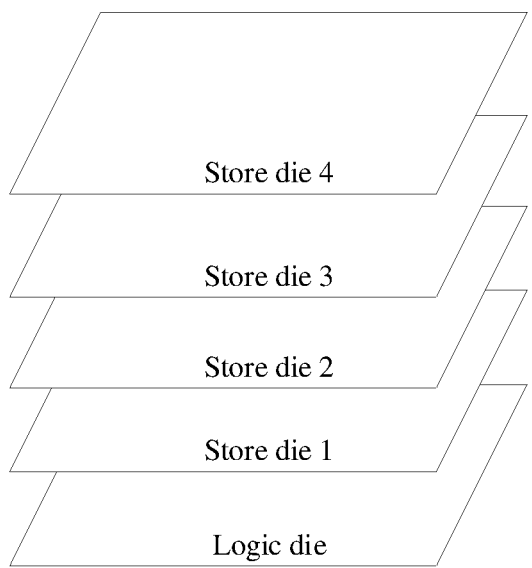
FIG. 2 is a schematic diagram of a hierarchical structure of dies in an example memory chip according to an embodiment of the present disclosure.

FIG. 2 is a schematic diagram of a hierarchical structure of dies in an example memory chip according to an embodiment of the present disclosure.

As shown in FIG. 2, in embodiments of the present disclosure, a logic die and store dies in a memory chip may be disposed hierarchically in a 3D stacking manner. The logic die is located at a bottom layer. The store dies are located above the logic die. A projection of the store dies on a plane in which the logic die is located may occupy a same area as the logic die. When there are multiple store dies, the multiple store dies are also disposed hierarchically. Areas occupied by projections of the store dies on a plane in which the logic die is located may be the same. In an example, one memory chip may include one logic die and an integer multiple of 4 store dies. In embodiments of the present disclosure, the logic die may also be referred to as a bottom film, or a base die.

Figure 3:
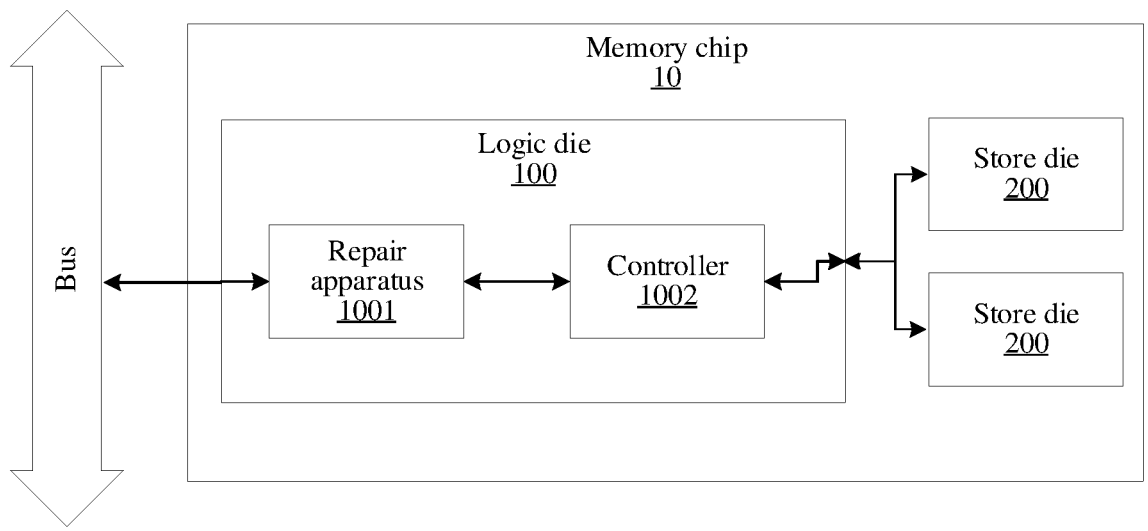
FIG. 3 is a schematic diagram of a logical structure of an example memory chip according to an embodiment of the present disclosure.

FIG. 3 is a schematic diagram of a logical structure of an example memory chip according to an embodiment of the present disclosure.

In embodiments of the present disclosure, as shown in FIG. 3, in an example, the logic die 100 may include a repair apparatus 1001 and a controller 1002. In an example, the logic die may further include an external interface for communicating with a system bus, and an internal interface for communicating with each store die.

It should be noted that, in another embodiment of the present disclosure, in an example, the memory chip may also communicate with the system bus by using a primary chip. A repair apparatus and a controller may be disposed on the primary chip. The controller may access a storage unit in each store die on the memory chip by using the logic die in the memory chip. The repair apparatus and the controller in the primary chip may perform a method similar to the repair apparatus and the controller in the structure shown in FIG. 3. In this arrangement, the controller and the repair apparatus may not be disposed in the logic die of the memory chip.

The following describes the technical solution provided in the present disclosure by using examples.

In embodiments of the present disclosure, with continuous development of semiconductor technologies, a chip scale is increasingly large, and a working frequency is increasingly high. For example, a DRAM is a large-capacity and high-density semiconductor memory. However, there is a partial failure probability in a production process and a working state of a chip, leading to a decrease in a chip yield rate.

Therefore, a redundant row may be deployed in the store die of the memory chip to replace a failed data row. In embodiments of the present disclosure, a repair technology based on the redundant row may be referred to as a row redundancy technology.

In embodiments of the present disclosure, the store die may include at least one storage unit and at least one redundant unit.

For example, a store die may be divided into a plurality of rows on arrays deployed on the store die. Each row includes one or more minimum units. The plurality of rows obtained by dividing the arrays on the store die may be divided into at least one data storage area and at least one redundant area, an original address segment is configured for each data storage area, and a redundant address segment is configured for each redundant area. Each original address segment and each redundant address segment do not overlap each other.

In an example, each data storage area may include at least one storage unit. Each storage unit may include one or more data rows. An original address of each storage unit belongs to an original address segment corresponding to a data storage area to which the storage unit belongs. Each redundant area may include at least one redundant unit. Each redundant unit may include one or more redundant rows. A redundant address of a redundant unit in each redundant area belongs to a redundant address segment corresponding to a redundant area to which the redundant unit belongs. In an example, a quantity of rows included in each redundant unit may be the same as a quantity of rows included in each storage unit.

When a storage unit in a data storage area fails, the faulty storage unit may be referred to as a failed unit. The memory chip uses a redundant unit located in a redundant area to replace the failed unit to complete a data access operation, to improve the chip yield rate.

In embodiments of the present disclosure, M data storage areas and N redundant areas may be deployed on a store die. M and N are positive integers. In an example, M≥N. A correspondence between the M data storage areas and the N redundant areas may be flexibly configured.

In an example, one data storage area may correspond to one redundant area. Based on this, a redundant unit in the redundant area may be used only to replace a failed unit in the data storage area corresponding to the redundant area to which the redundant unit belongs. In another example, a plurality of data storage areas may correspond to one redundant area. Based on this, a redundant unit in the redundant area may be used to replace failed units in the plurality of data storage areas. In other words, storage units in the plurality of data storage areas may share a redundant unit in one redundant area.

In an actual application, the store die may include a plurality of banks, and each bank may include a plurality of sectors. In an example, one data storage area and one redundant area may be provided for each bank. In an example, one data storage area may be provided for each bank, and one redundant area may be provided for a plurality of banks. In an example, one data storage area and one redundant area may be provided for each sector. In an example, one data storage area may be provided for each sector, and one redundant area may be provided for a plurality of sectors. In an example, each storage unit may include at least one data row. A quantity of redundant rows included in each redundant unit may be the same as a quantity of data rows included in each storage unit.

In an example, one data storage area and one redundant area are provided for each sector. In each sector, a ratio of a quantity of rows in the data storage area to a quantity of redundant rows in the redundant area may be agreed on, for example, 2K:16. In another example, each store die includes a plurality of banks. In some banks, a redundant area may be deployed in each sector, and in the other banks, no redundant area may be deployed in each sector. In still another example, one bank may include a plurality of sectors. In some sectors, a redundant area may be deployed, and in the other sectors, no redundant area may be deployed. This is not limited in embodiments of the present disclosure.

Based on the foregoing system architecture, the following describes a redundant unit-based data access method according to embodiments of the present disclosure.

Figure 4:
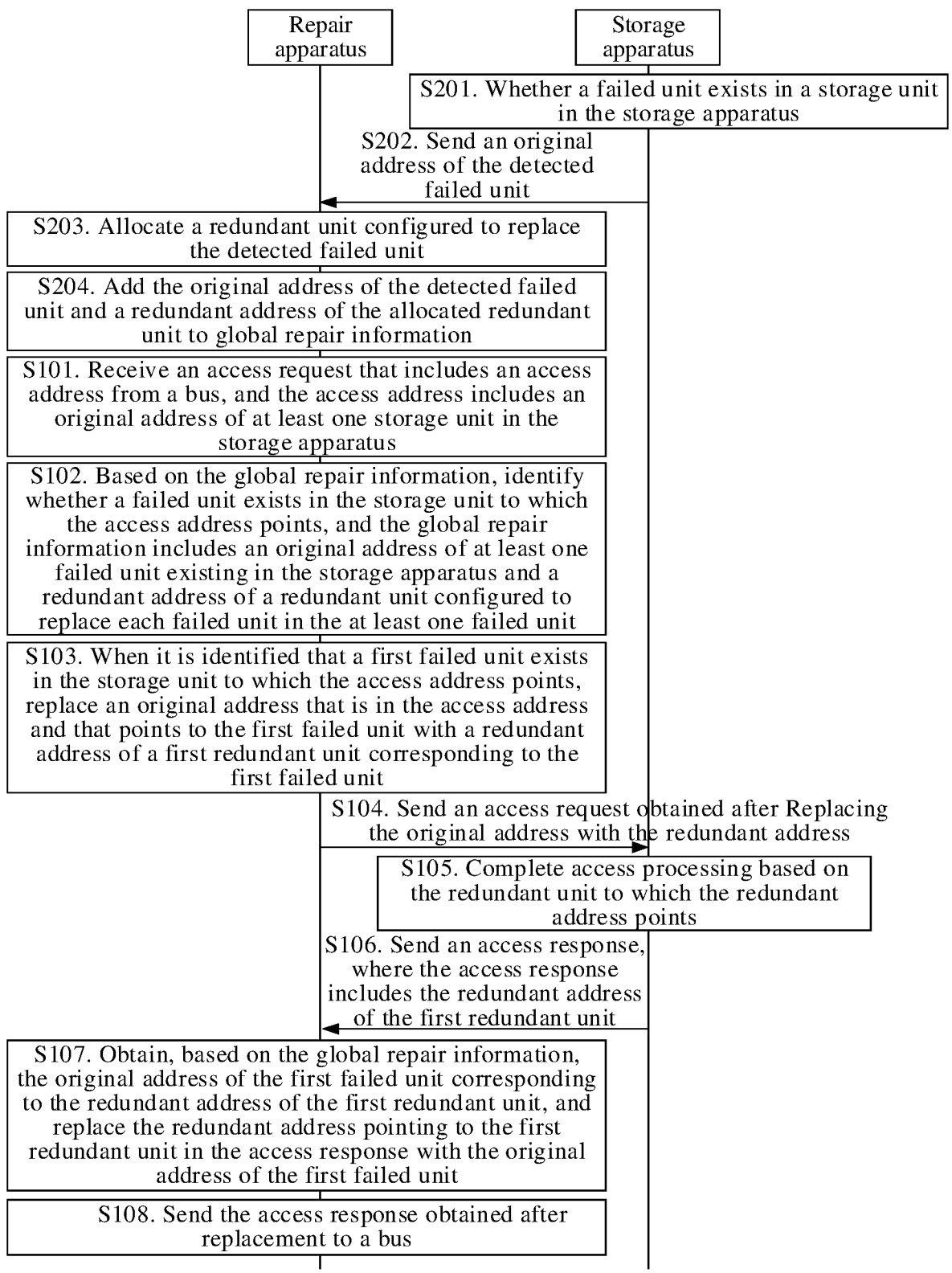
FIG. 4 is a first schematic interaction flowchart of an example storage unit access method according to an embodiment of the present disclosure.

FIG. 4 is a first schematic interaction flowchart of an example storage unit access method according to an embodiment of the present disclosure.

As shown in FIG. 4, an execution entity of embodiments of the present disclosure may include a repair apparatus and a storage apparatus.

In an example, the storage apparatus may be a store die that includes at least one storage unit and at least one redundant unit. The repair apparatus may be located on a logic die that includes a controller. The repair apparatus may communicate with the store die by using the controller.

S101. The repair apparatus receives an access request that includes an access address from a bus, and the access address includes an original address of the at least one storage unit in the storage apparatus.

In embodiments of the present disclosure, the repair apparatus may receive the access request from an I/O bus by using an external interface. The access request may be a read instruction, a write instruction, or the like. In an example, the read instruction may include a storage address of a requested to-be-read storage unit. In another example, the write instruction may include requested to-be-written data and a destination address of the data, that is, a storage address of a storage unit of the to-be-stored data. In embodiments of the present disclosure, the access request may alternatively be a refresh request. In an optional implementation, in embodiments of the present disclosure, the access request may be any data processing request that includes a storage address of data.

In embodiments of the present disclosure, before the data is written into the at least one storage unit in the storage apparatus, the storage apparatus may configure an original address segment for all storage units in the storage apparatus, and configure a redundant address segment for all redundant units in the storage apparatus. In an example, the store die includes at least one data storage area and at least one redundant area. Each data storage area includes at least one storage unit. An original address of each storage unit belongs to the original address segment. Each redundant area includes at least one redundant unit. A redundant address of each redundant unit belongs to the redundant address segment. The memory chip presents only the original address segment externally. In other words, the address included in the access request is the original address of the storage unit.

In embodiments of the present disclosure, it should be noted that, for example, the memory chip is a DRAM chip, the access address may be a logical block address (LBA), which is also referred to as a logical block address. In an example, the original address segment is LBA001 to LBA399, and the redundant address area may be LBA400 to LBA420.

S102. The repair apparatus identifies, based on global repair information, whether a failed unit exists in the storage unit to which the access address points. The global repair information includes an original address of at least one failed unit existing in the storage apparatus and a redundant address of a redundant unit configured to replace each failed unit in the at least one failed unit.

In an example, the repair apparatus may identify, based on the global repair information, whether the access address includes the original address of the failed unit.

In embodiments of the present disclosure, the global repair information may be stored in the repair apparatus. The repair apparatus may continuously update the global repair information in a chip working process. For example, the repair apparatus may obtain information of the failed unit detected by the storage apparatus in a processing process such as reading and writing data, refreshing data, and detecting and maintaining, allocate the redundant unit to the failed unit, and add, to the global repair information, a correspondence between the newly detected failed unit and the corresponding redundant unit. In an example, the global repair information may include original addresses of all detected failed units in the storage apparatus and a redundant address of a redundant unit configured to replace each failed unit.

In embodiments of the present disclosure, if the repair apparatus is deployed with an efuse, in a test phase, the repair apparatus may further store, in the efuse, information about a correspondence between the original address of the failed unit detected by the storage apparatus in the test phase and the redundant address of the redundant unit allocated by the repair apparatus to each failed unit. Then, each time the memory chip is powered on and operates, the repair apparatus may read, from the efuse, repair information recorded in the test phase, and use the repair information as initial global repair information.

In another embodiments of the present disclosure, implementations of obtaining and updating the global repair information by the repair apparatus is described in detail.

S103. When it is identified that a first failed unit exists in the storage unit to which the access address points, the repair apparatus replaces an original address that is in the access address and that points to the first failed unit with a redundant address of a first redundant unit corresponding to the first failed unit.

In an example, when it is identified that the access address includes the original address pointing to the first failed unit, it is determined that the first failed unit exists in the storage unit to which the access address points. The original address that is in the access address and that points to the first failed unit is replaced with the redundant address of the first redundant unit corresponding to the first failed unit. The first failed unit is any failed unit.

In an example, the access address includes a first original address. The logic die determines, by querying a global information table, that a first storage unit pointed to by the first original address has failed. The failed first storage unit is the first failed unit. The logic die further queries the global information table to obtain a first redundant address corresponding to the first original address. A first redundant unit pointed to by the first redundant address is configured to replace the first failed unit pointed to by the first original address.

In an example, the access address may include an address interval LBA001 to LBA010. It is assumed that LBA002 and LBA004 are original addresses of failed units recorded in the global repair information. If the redundant address of the redundant unit corresponding to the storage unit having the original address of LBA002 is LBA500 and the redundant address of the redundant unit corresponding to the storage unit having the original address of LBA004 is LBA501, access addresses obtained after replacement may be LBA001, LBA500, LBA003, LBA501, and LBA005 to LBA010.

S104. The repair apparatus sends an access request obtained after replacing the original address with the redundant address.

In an example, the access request obtained after replacement includes the first redundant address corresponding to the first redundant unit.

In an example, the storage apparatus is the store die, and the repair apparatus located on the logic die may send the access request obtained after replacement to the store die by using the controller on the logic die.

S105. The storage apparatus completes access processing based on the redundant unit to which the redundant address points.

The storage apparatus may access the redundant address. In an example, when the access request is a write instruction, the access request further includes to-be-written data, and the storage apparatus may write the to-be-written data into the redundant unit pointed to by the redundant address. Then, the storage apparatus may generate an access response. The access response includes the redundant address of the redundant unit storing the to-be-written data. In another example, when the access request is a read instruction, the storage apparatus may read data stored in the redundant unit to which the redundant address points. The data includes data read from the redundant unit to which the redundant address points.

S106. The storage apparatus sends the access response to the repair apparatus. The access response includes the redundant address of the first redundant unit.

In an example, when the access request is the write instruction, the access response includes the redundant address of the redundant unit storing the to-be-written data. In another example, when the access request is the read instruction, the access response includes the data read from the redundant unit pointed to by the redundant address.

In an example, the storage apparatus is the store die, and the repair apparatus located on the logic die may receive the access response sent by the storage apparatus by using the controller on the logic die.

S107. The repair apparatus obtains, based on the global repair information, the original address of the first failed unit corresponding to the redundant address of the first redundant unit, and replaces the redundant address pointing to the first redundant unit in the access response with the original address of the first failed unit.

In an example, the access response may include an address interval including LBA001, LBA500, LBA003, LBA501, and LBA005 to LBA010. It is assumed that LBA500 and LBA501 are redundant addresses of redundant units recorded in the global repair information. If the original address of the storage unit corresponding to the redundant unit having the redundant address of LBA500 is LBA002 and the original address of the failed unit corresponding to the redundant unit having the redundant address of LBA501 is LBA004, access addresses obtained after replacement may be LBA001 to LBA010.

In an example, the global repair information may support querying the redundant address of the corresponding redundant unit by using the original address of the failed unit, and may also support reverse querying of the original address of the corresponding failed unit by using the redundant address of the redundant unit. In another example, the repair apparatus may respectively store the global repair information as redundant address mapping information and original address reverse mapping information. When receiving the access request, the repair apparatus may query, based on the redundant address mapping information, the redundant address of the redundant unit corresponding to the original address of the storage unit. When receiving the access response, the repair apparatus may further query, based on the redundant address of the redundant unit, the original address of the corresponding storage unit.

S108. The repair apparatus sends an access response obtained after replacement to a bus.

In embodiments of the present disclosure, the repair apparatus and the storage apparatus cooperate with each other, to implement a process of completing data access based on the redundant unit.

According to the method according to embodiments of the present disclosure, the repair apparatus implements redundancy replacement repair based on the global repair information. A control function of the redundancy replacement repair may be set on the advanced logic die for implementation. A circuit supporting switching of a row selection signal does not need to be disposed in a store die. The circuit for switching the row selection signal is configured to directly transfer a row selection signal pointing to a failed row in a normal data storage area to a circuit of row selection signal of a redundant row that is in a redundant area and that is configured to replace the failed row. Based on this, a circuit structure on the store die is greatly simplified. Further, according to the technical solution provided in embodiments of the present disclosure, a tiled area occupied by the store die can be reduced by simplifying an optional circuit in the store die without reducing a storage capacity. When the store dies and the logic die are arranged in a hierarchical manner, because a tiled area occupied by each store die is reduced, a tiled area occupied by a final memory chip product can be greatly reduced. In other words, a redundancy replacement function is implemented by using a small die area, so that a store die area is reduced, and a product is miniaturized.

In addition, in embodiments of the present disclosure, each redundant unit may be one row in a sector. In comparison with the circuit for switching the row selection signal, because logic complexity of the circuit cannot be too large, only a combination of a plurality of rows can be used as a minimum replacement unit. In the method in embodiments of the present disclosure, one row is used as a minimum replacement unit in the redundancy replacement function. Therefore, a redundant resource can be planned and used at a finer granularity, and a failed unit in each sector can be flexibly and comprehensively repaired. For example, when three failed rows exist in a sector, and an interval between the three failed rows exceeds eight rows, if the minimum replacement unit is eight rows, 16 redundant row resources can actually repair only two failed rows, and then the sector cannot be repaired. When the method according to embodiments of the present disclosure is used, if the minimum replacement unit is one row, 16 redundant row resources can repair the three failed rows, so that the sector can be repaired.

Embodiment 2

Embodiments of the present disclosure further provide a technical solution related to a repair method of a group of storage units. The repair method according to embodiments of the present disclosure may be performed before the storage unit access method in the foregoing embodiments is performed. The repair apparatus may obtain or update the global repair information by using the storage unit repair method according to embodiments of the present disclosure.

In embodiments of the present disclosure, the repair apparatus may update the global repair information using the following manners. As shown in FIG. 4, embodiments of the present disclosure may further include the following steps.

S201. The storage apparatus detects whether a failed unit exists in the storage units in the storage apparatus.

In an example, the storage apparatus may be the store die. The store die may detect the failed unit when executing an instruction such as a data read instruction, a data write instruction, or a refresh instruction. This is not limited in embodiments of the present disclosure.

In an example, the failed unit detected by the storage apparatus may be a second failed unit. The second failed unit may be the first failed unit in the foregoing embodiments, or may be another failed unit.

S202. The storage apparatus sends the original address of the detected failed unit to the repair apparatus.

In an example, when the storage apparatus is the store die, and the repair apparatus is located on the logic die that includes the controller, the storage apparatus may send the original address of the failed unit to the repair apparatus by using the controller. In an example, the storage apparatus may send the original address of the failed unit to the repair apparatus when the failed unit exists.

In an example, the original address of the detected failed unit may be defined as an original address of the second failed unit.

S203. The repair apparatus allocates the redundant unit configured to replace the detected failed unit.

In embodiments of the present disclosure, an allocating method for the repair apparatus to allocate the redundant unit corresponding to the failed unit may be implemented in a plurality of manners, so that the complex and flexible redundancy replacement function can be implemented. In an example, a redundant unit configured to replace the second failed unit may be a second redundant unit.

In embodiments of the present disclosure, the storage apparatus may include at least one data storage area and at least one redundant area. Each data storage area includes at least one storage unit, and each redundant area includes at least one redundant unit. The storage apparatus may allocate the original address segment to a storage unit belonging to each data storage area, and allocate the redundant address segment to a redundant unit belonging to each redundant area. An address of any redundant address segment does not overlap an address of any original address segment. In an example, the storage apparatus may include M data storage areas and N redundant areas. M and N are positive integers. In an example, M may be greater than or equal to N.

In an optional allocation manner, the redundant unit may be allocated based on a proximity principle.

In an example, the storage apparatus may be provided with X functional areas. Each functional area may include one data storage area, and a quantity of redundant area in at least one of the X functional areas is not zero. For example, during redundant unit allocation, the repair apparatus may preferentially allocate, to a failed unit, a redundant unit belonging to a same functional area as the failed unit. If redundant units belonging to the same functional area have been allocated, a redundant unit in another functional area may be selected. In an example, the functional area may be a sector or a bank.

In another example, the storage apparatus may further be provided with a high-layer functional area and a low-layer functional area. Each high-layer functional area includes at least one low-layer functional area. Each low-layer functional area includes at least one data storage area. A quantity of redundant areas of at least one low-layer functional area in all low-layer functional areas is not zero. For example, the high-layer functional area may be a bank, and the low-layer functional area may be a sector. Each bank may include at least one sector.

For example, in an actual process of allocating the redundant unit, the storage apparatus may include a bank 0 and a bank 1. The bank 0 includes a sector 0 (defined as S01) and a sector 1 (defined as S02), and the bank 1 includes a sector 0 (defined as S11) and a sector 1 (defined as S12). The storage apparatus may be provided with the redundant area in at least one of the four sectors S01, S02, S11, and S12. In an example, the storage apparatus may include the first storage unit located in S01 and the first redundant unit located in S01. In another example, the storage apparatus may include the first storage unit located in S01 and the first redundant unit located in S02. In another example, the storage apparatus may include the first storage unit located in S01 and the first redundant unit located in S11.

The repair apparatus may preferentially select a redundant unit in a redundant area corresponding to a same low-layer functional area as a data storage area and use the redundant unit as the first redundant unit. If all redundant units in the redundant area corresponding to the same low-layer functional area have been allocated, the repair apparatus may select, in a same high-layer functional area as the data storage area, a redundant unit in a redundant area in a closest low-layer functional area. If all redundant units in the redundant area corresponding to the closest low-layer functional area have been allocated, a redundant unit in a redundant area in another low-layer functional area in the same high-layer functional area may be selected. If all redundant units in redundant areas in the same high-layer functional area have been allocated, a redundant unit in a redundant area in another high-layer functional area may be selected.

For example, one data storage area and one redundant area are provided for each sector. First, if the first failed unit is a storage unit of a first data storage area, a redundant unit in a redundant area belonging to a same sector as the first data storage area is preferentially selected as the first redundant unit corresponding to the first failed unit. Second, if all redundant units in the redundant area belonging to the same sector have been allocated, a redundant unit in a redundant area that is in a sector closest to the first data storage area and that belongs to a same bank as the first data storage area is selected as the first redundant unit corresponding to the first failed unit. Third, if all redundant units in redundant areas of the same bank have been allocated, a redundant unit in a redundant area in a bank closest to the bank of the first data storage area is selected as the first redundant unit corresponding to the first failed unit. Finally, if all redundant units in redundant areas in all banks on the store die have been allocated, a redundant unit in a redundant area in a store die closest to the store die is selected as the first redundant unit corresponding to the first failed unit. In other words, in a possible allocation manner, the first failed unit and the first redundant unit may be located in a same sector. Alternatively, the first failed unit and the first redundant unit may be located in different sectors of a same bank. Alternatively, the first failed unit and the first redundant unit may be located in different banks of a same store die.

In the foregoing allocation manner, all redundant resources on the storage apparatus are controlled and centralized on the repair apparatus. In embodiments of the present disclosure, cross-sector/cross-bank sharing of global redundant resources can be actually implemented, thereby effectively improving redundant resource utilization and improving a chip yield rate. When each sector or each bank fails unevenly, failed units of each sector and each bank can be repaired. For example, when a quantity of rows of failed units in a sector exceeds a quantity of rows of redundant units configured in the sector, an idle redundant unit in another sector may be scheduled to perform comprehensive repair, to avoid a case in which a large quantity of failed units in a sector cannot be repaired even when there are idle redundant units on the entire store die.

S204. The repair apparatus adds the original address of the detected failed unit and the redundant address of the allocated redundant unit to the global repair information.

The global repair information may include correspondences between one or more groups of failed units and redundant units.

It should be noted that steps S201 to S204 may also be performed after step S101.

In this repair manner, when detecting the failed unit, the storage apparatus may notify the repair apparatus to allocate the corresponding redundant unit, so that the global repair information may be dynamically updated in a process in which a read/write instruction, the refresh instruction, or the like can trigger detection of the failed unit. When the storage unit access method is executed, the read/write operation may be performed on the redundant unit, to avoid using the failed unit, thereby improving an access speed of a memory chip.

Figure 5:
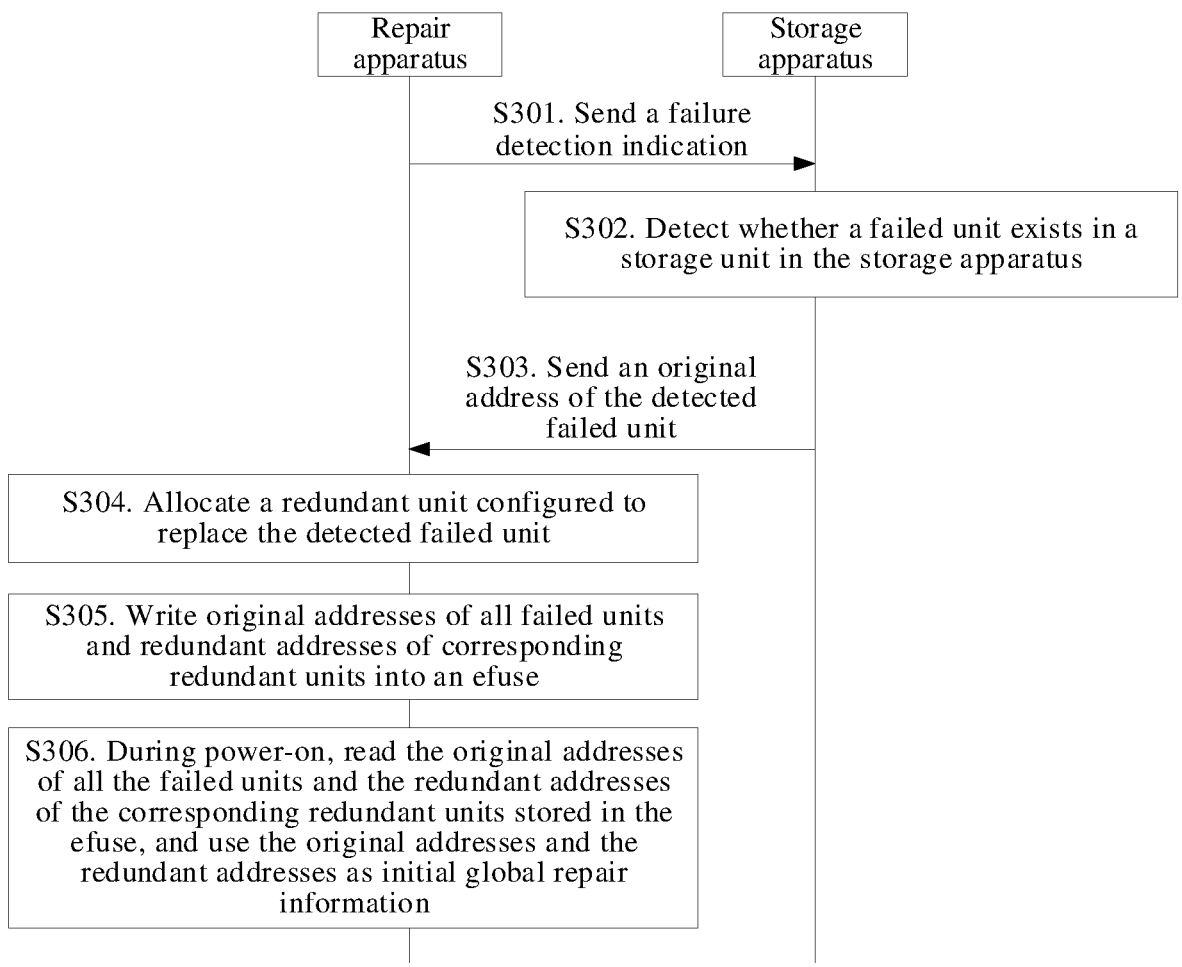
FIG. 5 is a schematic interaction flowchart of an example storage unit repair method according to an embodiment of the present disclosure.

FIG. 5 is a schematic interaction flowchart of a storage unit repair method according to an embodiment of the present disclosure.

In embodiments of the present disclosure, a repair apparatus may further obtain global repair information using the following manners.

In embodiments of the present disclosure, a one-time programmable memory (efuse) may be further deployed in the repair apparatus or a logic die in which the repair apparatus is located. In a test phase before a chip is delivered from a factory, corresponding information of a detected failed unit and an allocated replacement unit, that is, repair information recorded in the test phase, may be stored in the efuse. After the memory chip is delivered from a factory, each time the repair apparatus is powered on and operates, the repair apparatus may read, from the efuse, the repair information written in the test phase and use the repair information as initial global repair information, and continuously update the global repair information with reference to the method in FIG. 4.

As shown in FIG. 5, embodiments of the present disclosure may further include the following steps:

S301. The repair apparatus sends a failure detection indication to a storage apparatus.

The failure detection indication may be a test instruction obtained from an I/O bus, for example, may be a write instruction, a read instruction, or a refresh instruction. Carried access addresses are original addresses corresponding to all rows on a store die. In an example, when the storage apparatus is the store die, and the repair apparatus is located on a logic die that includes a controller, the repair apparatus may send various messages to the storage apparatus by using the controller.

S302. The storage apparatus detects whether a failed unit exists in a storage unit.

In an example, the failed unit detected by the apparatus before encapsulation may be a third failed unit. The third failed unit may be the first failed unit in the foregoing embodiments, or may be another failed unit.

S303. The storage apparatus sends an original address of the detected failed unit to the repair apparatus.

S304. The repair apparatus allocates a redundant unit configured to replace the failed unit.

In an example, a redundant unit configured to replace the third failed unit may be defined as a third redundant unit.

Implementation processes of steps S302 to S304 are similar to that of S201 to S203. For details, refer to related descriptions in S201 to S203.

S305. The repair apparatus writes original addresses of all failed units and redundant addresses of corresponding redundant units into the efuse.

The original addresses of all the failed units and the redundant addresses of the corresponding redundant units that are recorded in the test phase may be referred to as test repair information. In an example, the repair apparatus writes, into the efuse, the original addresses of all the failed units detected before encapsulation and the redundant address of the redundant unit corresponding to each failed unit.

S306. During power-on, the repair apparatus reads the original addresses of all the failed units and the redundant addresses of the corresponding redundant units stored in the efuse, and uses the original addresses and the redundant addresses as initial global repair information.

In this manner, a correspondence between the failed unit detected in the test phase and the allocated redundant unit is written into the efuse. Based on a feature that the efuse only allows writing once and data stored in the efuse will not be lost after power-off, after the memory chip is delivered from the factory, the repair apparatus can directly obtain the repair information each time the repair apparatus is powered on. This avoids repeated detection each time the repair apparatus is powered on, thereby reducing energy consumption of the store die during performing repeated detection and repair operations, and improving access efficiency of the memory chip.

In embodiments of the present disclosure, according to the foregoing two repair methods, a repair operation on the storage unit can be performed when the memory chip is in a working state and when the memory chip is in the test phase, and the memory chip may simultaneously support execution of the foregoing two repair methods.

It should be noted that, when one logic die is connected to a plurality of store dies, the correspondence between the failed unit detected in the test phase and the allocated redundant unit in each store die may be simultaneously written into the efuse.

The following describes in detail the methods according to embodiments of the present disclosure by using specific examples.

Figure 6A:
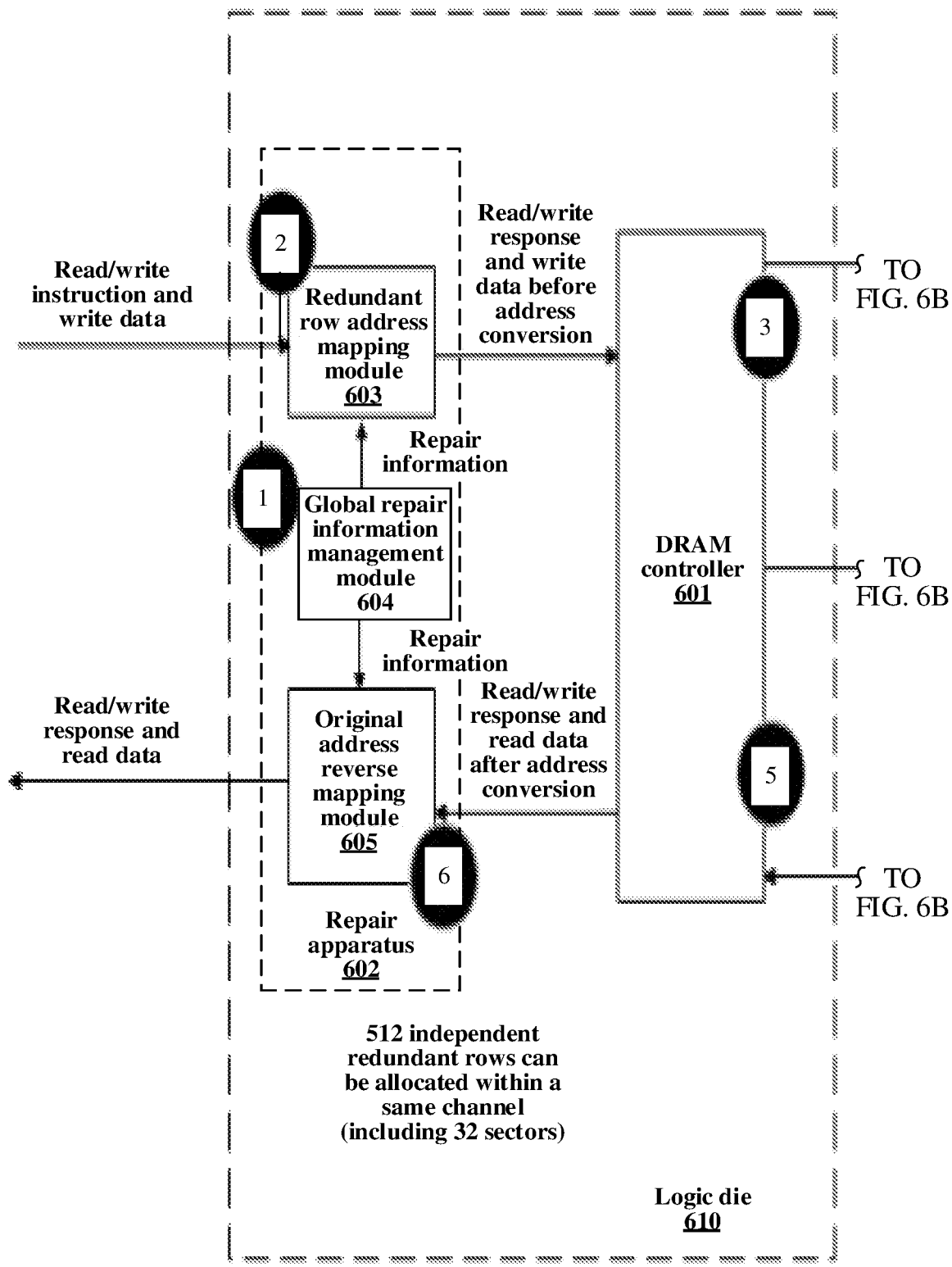
FIG. 6A and FIG. 6B are a schematic diagram of a system architecture and a processing process when an example storage unit access method is applied to a DRAM according to an embodiment of the present disclosure.
Figure 6B:
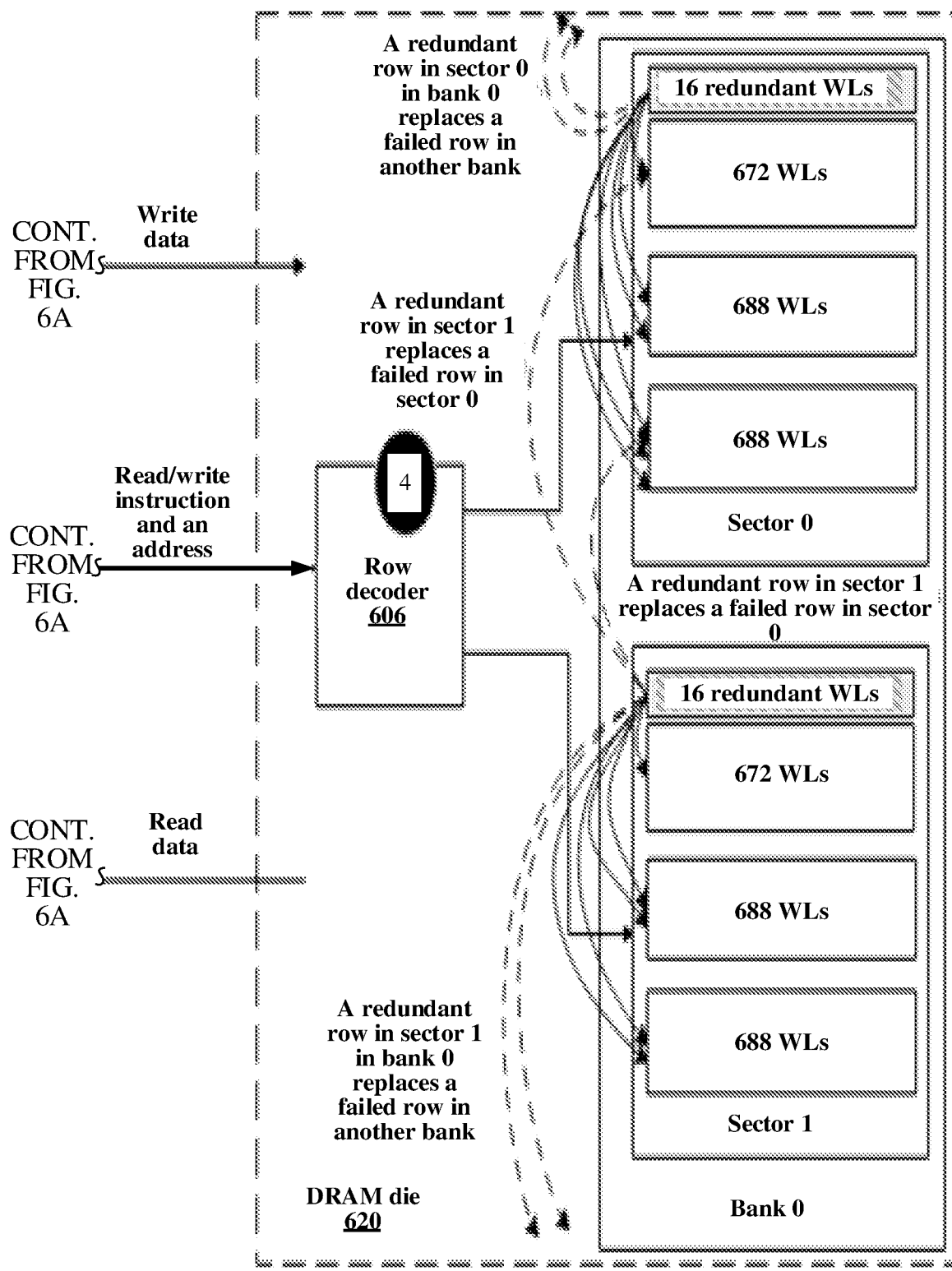

FIG. 6A and FIG. 6B are a schematic diagram of a system architecture and a processing process when an example storage unit access method is applied to a DRAM according to an embodiment of the present disclosure.

As shown in FIG. 6A and FIG. 6B, a memory chip in embodiments of the present disclosure may include a logic die 610 and a DRAM die 620.

The logic die may include a DRAM controller 601, a redundant row address mapping module 603, a global repair information (Repair info) management module 604, and an original address reverse mapping module 605. The modules 603 to 605 may form a repair apparatus 602. The DRAM die 620 may include a row decoder 606 and a storage array deployed as a bank and sectors (the part on the right side of the row decoder in FIG. 6B). The row decoder is also referred to as a row address decoder or a row address decoding module.

It should be noted that, in a global fine-granularity DRAM row redundancy repair solution provided in embodiments of the present disclosure, a redundant storage resource used for failure repair may be evenly distributed in each sector or each bank on the DRAM die, for example, 16 redundant rows for every 2K rows (as shown by gray blocks in FIG. 6B); in addition, control of replacing and repairing a failed row by using a redundant row is implemented on the logic die, and logic related to replacement and repair does not need to be set on the DRAM die.

An example in which a storage unit is one data row and a redundant unit is one redundant row is used for description (each row may be defined as 1 WL).

As shown in FIG. 6A and FIG. 6B, steps in embodiments of the present disclosure may include two parts, that is, steps in a chip test process and steps in a chip normal use phase. The steps in the chip test phase may be as follows:

Step 1: If the DRAM die finds a failed unit in a normal data storage area, the DRAM die determines which redundant row is to use for replacement, according to an allocation policy, for example, a proximity principle, that is, a redundant unit in a same sector or a redundant unit in a same bank may be preferentially selected. All repair information of the memory chip is burnt centrally onto the logic die and needs to be recorded in the global repair information management module by burning an efuse. In a normal use scenario, when the chip is powered on, the global repair information management module reads the repair information recorded in the test phase from the efuse and writes the repair information into the redundant row address mapping module and the original row address reverse mapping module.

In embodiments of the present disclosure, the global repair information management module on the logic die mainly is formed by an efuse resource, and is configured to record global redundant row repair information of the chip. A to-be-replaced target failed row is recorded in failure repair information in unit of redundant row. In addition, a mechanism of fault tolerance and supplementing record needs to be considered. The global repair information management module may also be referred to as an efuse module.

Step 2: In a normal use scenario, when a user initiates read/write access to the chip, a read/write instruction first enters the redundant row address mapping module for processing, and the redundant row address mapping module identifies a failed row address in an original access address, and replaces the original failed row address with a redundant row address according to a determined replacement policy.

In embodiments of the present disclosure, the redundant row address mapping module uses a content addressable memory (CAM) to form a failed row address mapping table with the redundant row address. CAM lookup is performed on a row address in each access instruction, and a matched failed row address is replaced with a corresponding CAM address (that is, a redundant row address). The CAM can load redundancy repair information by using the efuse during power-on, or can add redundancy repair information as required during use. In an example, the replacement policy may be a proximity principle, a balance principle, or the like. For example, a redundant unit in a redundant area in a sector with a lowest utilization rate in a same bank as the failed row address is preferentially selected.

Step 3: An access instruction in which the failed row address is replaced with the redundant row address normally enters the controller for processing. The controller sends a corresponding instruction to the DRAM die in a DRAM time sequence.

Step 4: The row address decoding module on the DRAM die decodes the received row address into a row selection signal (redundant rows are also uniformly addressed, and addresses of the redundant rows may be outside an address range of normal data rows). For an instruction in which the failed row address is replaced with the redundant row address, the instruction is directly decoded into a row selection signal of the redundant row. In this case, all access operations are actually operations on a minimum unit in the redundant row. For example, each storage unit may include a minimum unit in at least one row and at least one column. For example, the storage unit includes a minimum unit in one row and one column.

Step 5: After completing the operation on the DRAM die, the controller returns a corresponding read/write response and read data. For a read write operation on the redundant row, the controller normally returns address information of the redundant row to an original address reverse mapping module.

Step 6: The original address reverse mapping module checks the redundant row address, searches an original row address reverse mapping table, converts the redundant row address in a read/write response into an original row address, and returns the read/write response and the read data to a user side. The user is unaware of the redundancy replacement operation on the failed address.

In an example, the original row address reverse mapping table in the foregoing embodiments may be a global information table.

In embodiments of the present disclosure, the original address reverse mapping module may use an SRAM to form the original row address reverse mapping table with redundant row addresses. The SRAM records the address of each failed unit. When it is identified that a row address in the read/write response returned by the controller is the redundant row address (outside a normal data storage address range), the redundant row address is used to search the SRAM for the corresponding original address, and reverse replacement is performed.

In embodiments of the present disclosure, the global repair information management module, the redundant row address mapping module, and the original row address reverse mapping module cooperate with other module to support global redundancy replacement repair of the entire chip, and support fine-granularity replacement repair of a single row.

Embodiment 3

Embodiments of the present disclosure further provide a repair apparatus.

Figure 7:
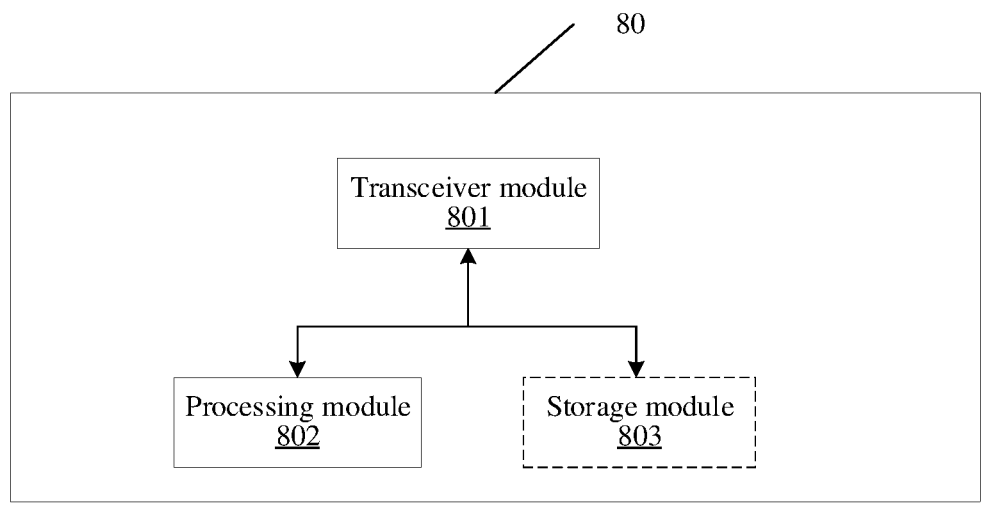
FIG. 7 is a first schematic diagram of a structure of an example repair apparatus according to an embodiment of the present disclosure.

FIG. 7 is a first schematic diagram of a structure of a repair apparatus according to an embodiment of the present disclosure. As shown in FIG. 7, the repair apparatus in embodiments of the present disclosure may include a transceiver module 801 and a processing module 802. The transceiver module is configured to communicate with a bus and a storage apparatus. In an optional implementation, the repair apparatus may further include a storage module 803.

In a first optional implementation of the repair apparatus: The transceiver module is configured to receive an access request that includes an access address. The access address includes an original address of at least one storage unit in the storage apparatus. The processing module is configured to identify, based on global repair information, whether a failed unit exists in the storage unit to which the access address points. The global repair information includes an original address of at least one failed unit existing in the storage apparatus and a redundant address of a redundant unit configured to replace each failed unit in the at least one failed unit. When it is identified that a first failed unit exists in the storage unit to which the access address points, an original address that is in the access address and that points to the first failed unit is replaced with a redundant address of a first redundant unit corresponding to the first failed unit. The transceiver module is further configured to send an access request obtained after replacing the original address with the redundant address.

In a possible implementation, the transceiver module is further configured to receive an original address, sent by the storage apparatus, of a second failed unit existing in the storage apparatus, before receiving the access request that includes the access address. The processing module is configured to allocate a second redundant unit configured to replace the second failed unit, and add, to the global repair information, a correspondence between the original address of the second failed unit and a redundant address of the second redundant unit. The second failed unit may be the same as or different from the first failed unit.

In a possible implementation, the repair apparatus includes a one-time programmable memory (efuse). The transceiver module is further configured to receive an original address, sent by the storage apparatus, of a third failed unit existing before encapsulation in the storage apparatus, before receiving the access request that includes the access address. The processing module is further configured to allocate a third redundant unit configured to replace the third failed unit existing before encapsulation, store, in the efuse, a correspondence between the original address of the third failed unit existing before encapsulation and a redundant address of the third redundant unit, and add, to the global repair information, the correspondence that is between the original address of the third failed unit existing in the storage apparatus and the redundant address of the third redundant unit and that is read from the efuse, each time the repair apparatus is powered on. The third failed unit is the same as or different from the first failed unit.

In a possible implementation, the transceiver module is further configured to receive an access response that includes the redundant address of the first redundant unit and is sent by the storage apparatus. The processing module is further configured to obtain, based on the global repair information, the original address of the first failed unit corresponding to the first redundant unit, and add the original address of the first failed unit to the access response. The transceiver module is further configured to send an access response that includes the original address of the first failed unit to a bus.

In a second optional implementation of the repair apparatus: The transceiver module is configured to receive an original address, sent by the storage apparatus, of a failed unit existing in at least one storage unit in the storage apparatus. The processing module is configured to allocate a redundant unit configured to replace the failed unit, and configured to add the original address of the failed unit and a redundant address of the redundant unit to global repair information.

In a possible implementation, the repair apparatus includes a one-time programmable memory (efuse).

The transceiver module is specifically configured to receive the original address, sent by the storage apparatus, of at least one failed unit existing before encapsulation in the storage apparatus. The processing module is specifically configured to allocate a redundant unit configured to replace each failed unit existing before encapsulation; specifically configured to store, in the efuse, a correspondence between an original address of each failed unit existing before encapsulation and a redundant address of the redundant unit corresponding to each failed unit; and each time the repair apparatus is powered on, add, to the global repair information, a correspondence that is between the original address of the at least one failed unit existing in the storage apparatus and the redundant address of the redundant unit corresponding to each failed unit and that is read from the efuse.

For details and technical effects of other technical solution in this embodiment of the present disclosure, refer to descriptions in other embodiments of the present disclosure.

Embodiments of the present disclosure further provide a storage apparatus.

Figure 8:
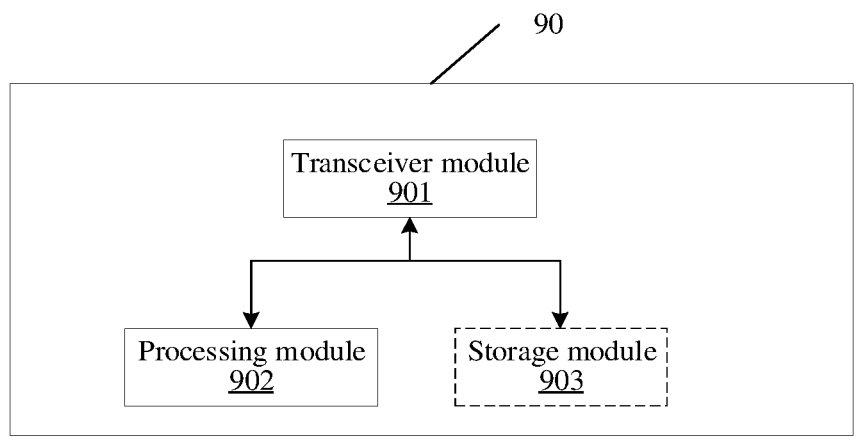
FIG. 8 is a first schematic diagram of a structure of an example storage apparatus according to an embodiment of the present disclosure.

FIG. 8 is a first schematic diagram of a structure of an example storage apparatus according to an embodiment of the present disclosure. As shown in FIG. 8, the storage apparatus in embodiments of the present disclosure may include a transceiver module 901 and a processing module 902. The transceiver module is configured to communicate with a bus and the storage apparatus. In an optional implementation, the storage apparatus may further include a storage module 903.

In a first optional implementation of the storage apparatus: The transceiver module is configured to receive an access request that is sent by a repair apparatus and includes an access address. The access address includes a redundant address of a redundant unit in the storage apparatus, and the redundant unit is configured to replace a failed unit in at least one storage unit. The processing module is configured to access the redundant address. The transceiver module is further configured to send an access response to the repair apparatus.

In a possible implementation, the processing module is further configured to detect whether a failed unit exists in the storage unit in the storage apparatus, before the access request that includes the access address and that is sent by the repair apparatus is received. The transceiver module is further configured to send an original address of the failed unit to the repair apparatus when the failed unit exists in the storage unit in the storage apparatus, so that the repair apparatus allocates the redundant unit configured to replace the failed unit, and adds, to global repair information, a correspondence between the original address of the failed unit and the redundant address of the redundant unit.

In a second implementation of the storage apparatus: The processing module is configured to detect whether a failed unit exists in the storage apparatus. The transceiver module is configured to send an original address of the failed unit to a repair apparatus when the failed unit exists in a storage unit in the storage apparatus.

In a possible implementation, the processing module is specifically configured to detect whether a failed unit exists in the storage unit in the storage apparatus, before the storage apparatus is encapsulated. The transceiver module is specifically configured to send the original address of the failed unit to the repair apparatus when the failed unit exists in the storage unit in the storage apparatus.

For details and technical effects of other technical solution in this embodiment of the present disclosure, refer to descriptions in other embodiments of the present disclosure.

Figure 9:
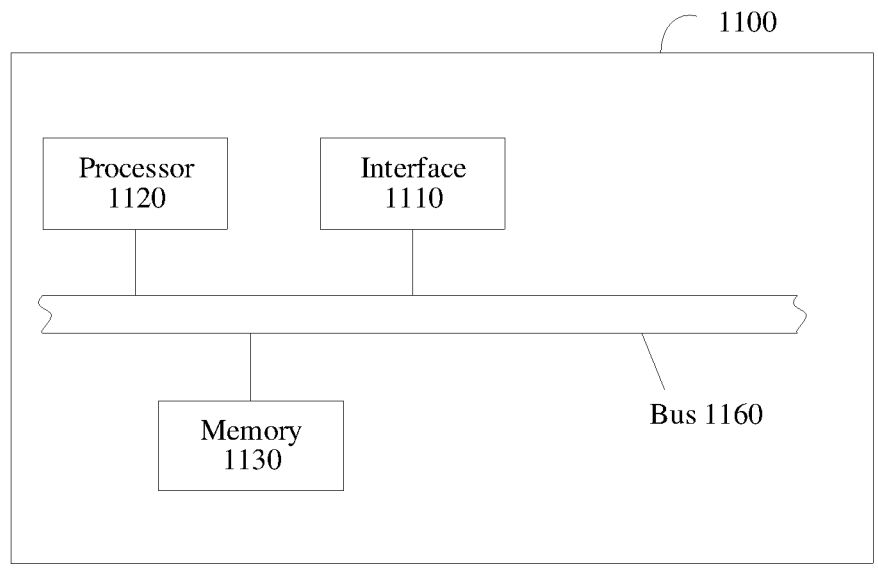
FIG. 9 is a second schematic diagram of a structure of an example repair apparatus according to an embodiment of the present disclosure.

FIG. 9 is a second schematic diagram of a structure of an example repair apparatus according to an embodiment of the present disclosure. As shown in FIG. 9, the repair apparatus in embodiments of the present disclosure may include an interface 1110, a processor 1120, and a memory 1130. The interface is configured to connect to a storage apparatus. The memory is configured to store instructions. The processor is configured to execute the instructions to implement the method in the foregoing embodiments. The repair apparatus may further include a bus 1160 for internal interconnection.

In a possible implementation, the storage apparatus is a store die, and the repair apparatus is a logic die; or the storage apparatus is a store die, the repair apparatus is located on a logic die that includes a controller, and the repair apparatus is connected to the store die by using the controller; or the storage apparatus is a memory chip, and the repair apparatus is a primary chip; or the storage apparatus is a memory chip, the repair apparatus is located on a primary chip that includes a controller, and the repair apparatus is connected to the memory chip by using the controller.

In a possible implementation, the memory further includes a one-time programmable memory (efuse).

In an example, the store die may be a DRAM die, and the controller may be a DRAM controller.

Figure 10:
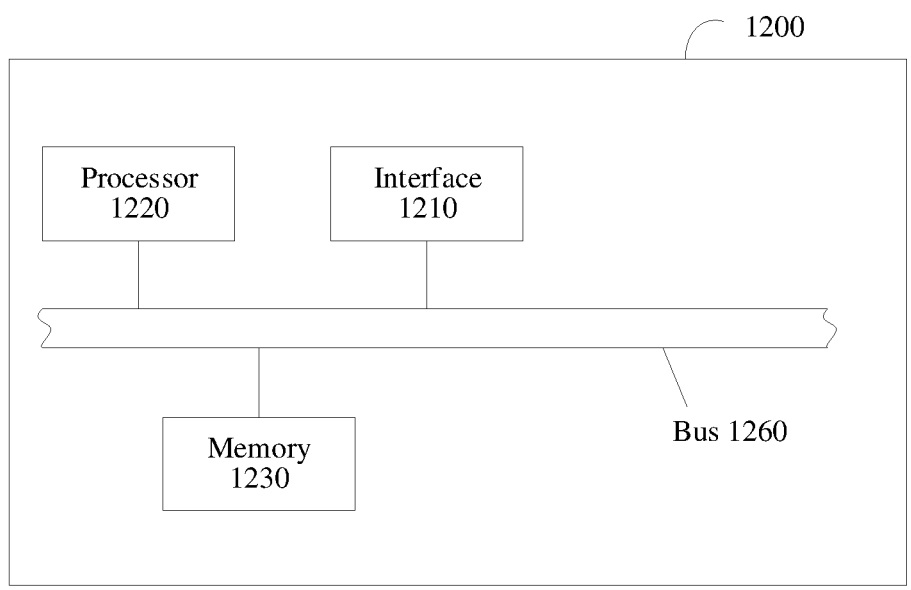
FIG. 10 is a second schematic diagram of a structure of an example storage apparatus according to an embodiment of the present disclosure.

FIG. 10 is a second schematic diagram of a structure of an example storage apparatus according to an embodiment of the present disclosure. As shown in FIG. 10, the storage apparatus in embodiments of the present disclosure may include an interface 1210, a processor 1220, and a memory 1230. The interface is configured to connect to a repair apparatus. The memory is configured to store instructions. The processor is configured to execute the instructions to implement the method in the foregoing embodiments. The storage apparatus may further include a bus 1260 for internal interconnection.

In a possible implementation, the storage apparatus is a store die, and the repair apparatus is a logic die; or the storage apparatus is a store die, the repair apparatus is located on a logic die that includes a controller, and the repair apparatus is connected to the store die by using the controller.

Embodiments of the present disclosure further provide a repair apparatus. The repair apparatus may be configured to perform any method performed by the repair apparatus in the foregoing embodiments. In an example, the repair apparatus may be a logic die in a memory chip. In still another example, the repair apparatus may be located on a logic die in a memory chip, and a controller may be further deployed on the logic die. The repair apparatus may communicate with a bus, or may communicate with the store die in the memory chip by using the controller.

Embodiments of the present disclosure further provide a storage apparatus. The storage apparatus may be configured to perform any method performed by the storage apparatus in the foregoing embodiments. In an example, the storage apparatus may be a store die in a memory chip. In another example, the storage apparatus may be located on a store die in a memory chip.

Embodiments of the present disclosure further provide a logic die. The logic die may be configured to perform any method performed by the repair apparatus in the foregoing embodiments. In an example, the logic die may include a repair apparatus and a controller. In an example, the repair apparatus may also be located in the controller. This is not limited in the present disclosure.

Embodiments of the present disclosure further provide a store die. The store die may be configured to perform any method performed by the storage apparatus in the foregoing embodiments.

Embodiments of the present disclosure further provide a memory chip. The memory chip may include a logic die and a store die. The logic die includes a repair apparatus and a controller. The store die may be configured to perform any method performed by the storage apparatus in the foregoing embodiments. The repair apparatus may be configured to perform any method performed by the repair apparatus in the foregoing embodiments.

Embodiments of the present disclosure further provide a primary chip. The primary chip may communicate with a bus and a memory chip. The primary chip may be configured to perform any method performed by the repair apparatus in the foregoing embodiments. In an example, the primary chip may include a repair apparatus and a controller. In an example, the repair apparatus may also be located in the controller. This is not limited in the present disclosure.

Embodiments of the present disclosure further provide a memory chip. The memory chip may communicate with a primary chip. The memory chip may be configured to perform any method performed by the storage apparatus in the foregoing embodiments.

Embodiments of the present disclosure further provide a controller. The controller is located on a logic die. The controller may be configured to forward an access instruction sent by a repair apparatus to a store die, and forward an access response, repair information, and the like that are sent by the store die to the repair apparatus. In an example, the controller is configured to receive the access instruction sent by the repair apparatus. The access instruction includes a redundant address pointing to a redundant unit in the store die. The redundant unit is configured to replace a failed unit in a storage unit in the store die. The controller may forward the access instruction to the store die. In an example, the controller may further receive the access response sent by the store die. The access response includes an access result obtained when an access request is executed based on the redundant address of the redundant unit. The controller may forward the access response that includes the redundant address of the redundant unit to the repair apparatus. In an example, the controller may be a DRAM controller.

All or a part of the foregoing embodiments may be implemented by software, hardware, firmware, or any combination thereof. When software is used to implement the embodiments, all or a part of the embodiments may be implemented in a form of a computer program product. The computer program product includes one or more computer instructions. When the computer program instructions are loaded and executed on a computer, the procedures or functions according to the present disclosure are all or partially generated. The computer may be a general-purpose computer, a dedicated computer, a computer network, or any other programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk), or the like.

What is claimed is:

1. A storage unit access method, applied to a repair apparatus, wherein the method comprises:
   receiving an access request that comprises an access address, wherein the access address comprises one or more original addresses of at least one storage unit in a storage apparatus, wherein the storage apparatus includes a transceiver and a processing circuit, and the repair apparatus includes a processing circuit and a memory;
   identifying, based on global repair information, whether a failed unit exists in the storage unit to which the access address points, wherein the global repair information comprises one or more original addresses of at least one failed unit in the storage apparatus and a redundant address of a redundant unit configured to replace each failed unit in the at least one failed unit;
   upon identification that a first failed unit exists in the storage unit to which the access address points, replacing an original address that is in the access address and that points to the first failed unit with a redundant address of a first redundant unit corresponding to the first failed unit; and
   sending an access request obtained after replacing the original address with the redundant address,
   wherein the method further comprises:
   receiving an access response that comprises the redundant address of the first redundant unit and that is sent by the storage apparatus;
   in response to the access response, replacing the redundant address of the first redundant unit with the original address of the first failed unit based on the global repair information; and
   sending an access response that comprises the original address of the first failed unit to a bus.

2. The method according to claim 1, wherein before receiving the access request, the method further comprises:
   receiving an original address, sent by the storage apparatus, of a second failed unit in the storage apparatus;
   allocating a second redundant unit configured to replace the second failed unit; and
   adding, to the global repair information, a correspondence between the original address of the second failed unit and a redundant address of the second redundant unit, wherein
   the second failed unit is the same as or different from the first failed unit.

3. The method according to claim 2, wherein the first redundant unit and the first failed unit are located in a same sector of the storage apparatus.

4. The method according to claim 1, wherein the repair apparatus further comprises a one-time programmable memory (efuse); and
   before receiving the access request, the method further comprises:
   receiving an original address, sent by the storage apparatus, of a third failed unit existing before encapsulation in the storage apparatus;
   allocating a third redundant unit configured to replace the third failed unit;

storing, into the efuse, a correspondence between the original address of the third failed unit and a redundant address of the third redundant unit; and each time the repair apparatus is powered on, adding, to the global repair information, the correspondence that is between the original address of the third failed unit in the storage apparatus and the redundant address of the third redundant unit and that is read from the efuse, wherein the third failed unit is the same as or different from the first failed unit.

5. The method according to claim 3, wherein the storage apparatus is a memory die, and the repair apparatus is a logic die.

6. The method according to claim 5, wherein the storage apparatus is the memory die, the repair apparatus is located on the logic die that comprises a controller, and the repair apparatus is connected to the memory die by using the controller;

the memory die comprises at least two data storage areas, and the global repair information comprises original addresses of all failed units in the at least two data storage areas and a redundant address of a redundant unit configured to replace each failed unit in the at least two data storage areas; and each of the at least one storage unit is a data row, and each redundant unit is a redundant row.

7. The method according to claim 1, wherein the first failed unit is a storage unit of a first data storage area, and the first redundant unit corresponding to the first failed unit is a redundant unit in a redundant area belonging to a same sector as the first data storage area.

8. The method according to claim 1, wherein the first failed unit and the first redundant unit are in different sectors of the same bank.

9. The method according to claim 1, wherein the first failed unit and the first redundant unit are in different banks of a same memory die.

10. A storage unit access method, applied to a storage apparatus including at least one storage unit, wherein the method comprises:

receiving an access request that is sent by a repair apparatus and comprises an access address, wherein the access address comprises a redundant address of a redundant unit in the storage apparatus, and the redundant unit is configured to replace a failed unit in the at least one storage unit, the storage apparatus includes a transceiver and a processing circuit, and the repair apparatus includes a processing circuit and a memory;

accessing the redundant address; and sending an access response to the repair apparatus, wherein the method further comprises:

sending an access response that comprises the redundant address of the redundant unit to the repair apparatus, so that, in response to the access response, the repair apparatus replaces the redundant address of the redundant unit with the original address of the failed unit based on global repair information and sends an access response that comprises the original address of the failed unit to a bus, wherein the global repair information comprises one or more original addresses of at least one failed unit in the storage apparatus and the redundant address of the redundant unit configured to replace each failed unit in the at least one failed unit.

11. A storage unit access method, applied to a storage apparatus including at least one storage unit, wherein the method comprises:

receiving an access request that is sent by a repair apparatus and comprises an access address, wherein the access address comprises a redundant address of a redundant unit in the storage apparatus, the redundant unit is configured to replace a failed unit in the at least one storage unit, the storage apparatus includes a transceiver and a processing circuit, and the repair apparatus includes a processing circuit and a memory;

accessing the redundant address; and sending an access response to the repair apparatus, wherein the method further comprises:

sending an access response that comprises the redundant address of the redundant unit to the repair apparatus, so that, in response to the access response, the repair apparatus replaces the redundant address of the redundant unit with an original address of the failed unit based on global repair information and sends an access response that comprises the original address of the failed unit to a bus, wherein the global repair information comprises one or more original addresses of at least one failed unit in the storage apparatus and the redundant address of the redundant unit configured to replace each failed unit in the at least one failed unit.

12. The method according to claim 10, wherein the storage apparatus is a memory die, and the repair apparatus is a logic die.

13. A repair apparatus, comprising an interface, at least one processor, and at least one memory, wherein the interface is configured to connect to a storage apparatus, wherein the storage apparatus includes a transceiver and a processing circuit;

the at least one memory is configured to store instructions that, when executed by the at least one processor, cause the repair apparatus to:

receive an access request that comprises an access address, wherein the access address comprises one or more original addresses of at least one storage unit in a storage apparatus;

identify, based on global repair information, whether a failed unit exists in the storage unit to which the access address points, wherein the global repair information comprises one or more original addresses of at least one failed unit in the storage apparatus and a redundant address of a redundant unit configured to replace each failed unit in the at least one failed unit;

upon identification that a first failed unit exists in the storage unit to which the access address points, replace an original address that is in the access address and that points to the first failed unit with a redundant address of a first redundant unit corresponding to the first failed unit; and send an access request obtained after replacing the original address with the redundant address, wherein the instructions, when executed by the at least one processor, further cause the repair apparatus to:

receive an access response that comprises the redundant address of the first redundant unit and that is sent by the storage apparatus;

in response to the access response, replace the redundant address of the first redundant unit with the original address of the first failed unit based on the global repair information; and send an access response that comprises the original address of the first failed unit to a bus.

14. The repair apparatus according to claim 13, wherein the instructions, when executed by the at least one processor, further cause the repair apparatus to, before receiving the access request, perform operations comprising:

receiving an original address, sent by the storage apparatus, of a second failed unit in the storage apparatus;

allocating a second redundant unit configured to replace the second failed unit; and adding, to the global repair information, a correspondence between the original address of the second failed unit and a redundant address of the second redundant unit, wherein the second failed unit is the same as or different from the first failed unit.

15. The repair apparatus according to claim 13, wherein the repair apparatus comprises a one-time programmable memory (efuse), and the instructions, when executed by the at least one processor, further cause the repair apparatus to, before receiving the access request, perform operations comprising:

receiving an original address, sent by the storage apparatus, of a third failed unit existing before encapsulation in the storage apparatus;

allocating a third redundant unit configured to replace the third failed unit;

storing, into the efuse, a correspondence between the original address of the third failed unit and a redundant address of the third redundant unit; and each time the repair apparatus is powered on, adding, to the global repair information, the correspondence that is between the original address of the third failed unit in the storage apparatus and the redundant address of the third redundant unit and that is read from the efuse, wherein the third failed unit is the same as or different from the first failed unit.

16. The repair apparatus according to claim 13, wherein the instructions, when executed by the at least one processor, further cause the repair apparatus to:

receive an original address, sent by a storage apparatus, of a failed unit in a storage unit in the storage apparatus;

allocate a redundant unit configured to replace the failed unit; and add the original address of the failed unit and a redundant address of the redundant unit to global repair information.

17. A non-transitory storage medium storing information comprising instructions that, when executed by at least one processor, control the at least one processor to perform operations comprising:

receiving an access request that comprises an access address, wherein the access address comprises one or more original addresses of at least one storage unit in a storage apparatus wherein the storage apparatus includes a transceiver and a processing circuit;

identifying, based on global repair information, whether a failed unit exists in the storage unit to which the access address points, wherein the global repair information comprises one or more original addresses of at least one failed unit in the storage apparatus and a redundant address of a redundant unit configured to replace each failed unit in the at least one failed unit;

upon identification that a first failed unit exists in the storage unit to which the access address points, replacing an original address that is in the access address and that points to the first failed unit with a redundant address of a first redundant unit corresponding to the first failed unit; and sending an access request obtained after replacing the original address with the redundant address, wherein, before receiving the access request, the operations further comprise:

receiving an access response that comprises the redundant address of the first redundant unit and that is sent by the storage apparatus;

in response to the access response, replacing the redundant address of the first redundant unit with the original address of the first failed unit based on the global repair information; and sending an access response that comprises the original address of the first failed unit to a bus.

18. The non-transitory storage medium according to claim 17, wherein the operations further comprise, before receiving the access request, performing operations including:

receiving an original address, sent by the storage apparatus, of a second failed unit in the storage apparatus;

allocating a second redundant unit configured to replace the second failed unit; and adding, to the global repair information, a correspondence between the original address of the second failed unit and a redundant address of the second redundant unit, wherein the second failed unit is the same as or different from the first failed unit.

* * * * *